(No Model.)
E. E. RIES.
CONDUIT FOR ELECTRIC AND CABLE RAILWAYS.
No. 338,556. Patented Mar. 23, 1886.
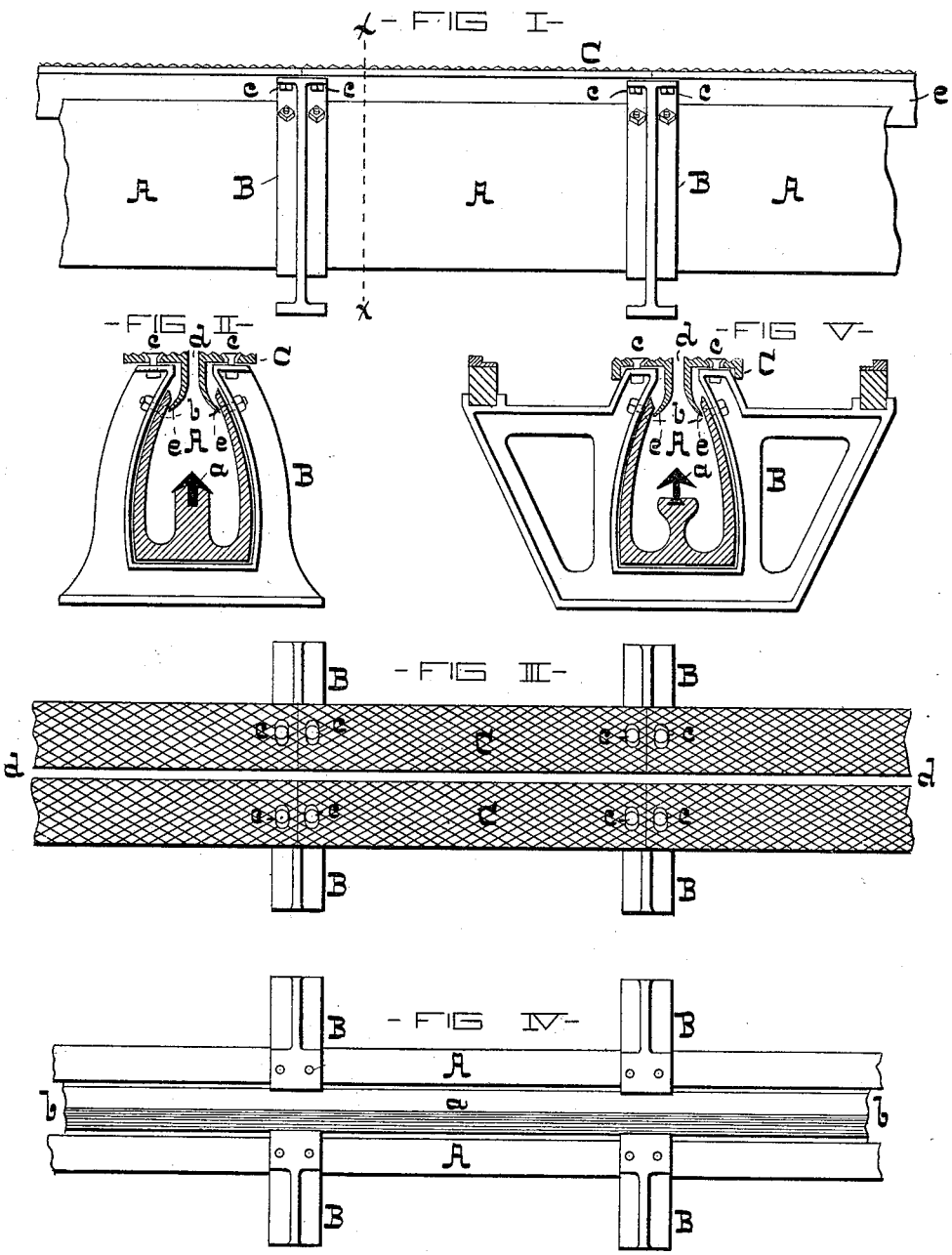

UNITED STATES PATENT OFFICE.

ELIAS E. RIES, OF BALTIMORE, MARYLAND, ASSIGNOR OF ONE-HALF TO ALBERT H. HENDERSON, OF SAME PLACE.

CONDUIT FOR ELECTRIC AND CABLE RAILWAYS.

SPECIFICATION forming part of Letters Patent No. 338,556, dated March 23, 1886.

Application filed September 28, 1885. Serial No. 178,356. (No model.)

*To all whom it may concern:*

Be it known that I, ELIAS E. RIES, of the city of Baltimore and State of Maryland, have invented certain Improvements in Conduits for Electric and Cable Railways, of which the following is a specification.

This invention relates to certain improvements in a conduit for the above-named purpose, in which the longitudinal opening through which the contact-bar or the grip, as the case may be, enters, is of such width as will admit of the placing in the conduit of the conducting-rails or the cable attachments, and the said longitudinal opening contracted in width or partially closed by means of plates which cover the edges of the conduit.

The said invention consists, first, in the combination, with a conduit of the description above mentioned, of frames or brackets to support the conduit and prevent the sides thereof from being contracted or distended, and to serve as means of connecting the sections or lengths of the conduit.

The said invention consists, secondly, in the combination, with the said conduit, of adjustable covering or closing plates, whereby the width of the slot formed by the opposing edges of the said plates can be increased or diminished, as may be required.

It consists, thirdly, in providing the said covering-plates with flanges, which are so curved that any water passing along them is carried toward the inner sides of the conduit and away from the central conducting-rail or the cable, and at the same time support the sides of the conduit against exterior pressure of the surrounding earth and prevent ingress of earth and water to the conduit.

In the drawings, forming a part hereof, Figure I is an exterior side elevation of a conduit embodying my improvements. Fig. II is a cross-section of Fig. I, taken on the dotted line *x x*. Fig. III is a top view of Fig. I. Fig. IV is a top view of the conduit without the covering-plates. Fig. V illustrates a modification in the construction of the supporting frames or brackets and the covering-plates, as hereinafter fully described.

A is the conduit, formed in suitable lengths, of any appropriate material, and adapted in the present case for an electric railway, it being for this purpose preferably made of non-electricity-conducting material—such as terra-cotta or earthenware—and provided with a central-conducting rail, *a*, which may be either firmly or removably secured, as shown. I do not, however, restrict myself to any peculiar means of applying the conducting-rail. The longitudinal opening *b* in the conduit is made considerably wider than is required for the reception of the contact-bar or the grip, in order that the rail *a* or the supporting devices for a cable can be readily placed in position, and to give free access to the interior of the conduit for various other purposes.

B B are supporting frames or brackets, preferably ribbed, as shown, to sustain the conduit and form the connection between the sections or lengths of the same. With this view a frame is placed where two sections or lengths of the conduit meet, and the ends of the sections are secured to the supporting-frames by means of bolts or in any other manner.

C C are covering or closing plates having roughened surfaces, as shown, secured to the frames B B by means of bolts *c*. The holes in the plates C are elongated, so that the plates may be moved toward or from the center of the conduit to give the required width to the slot *d*. The plates C are provided with downwardly-extending flanges *e*, which are curved, as shown in the drawings, to conduct water following them to the interior of the conduit away from the central conducting-rail, or the cable when the invention is applied to a cable road. The flanges *e* also support the edges of the conduit and prevent the admission of earth and water to the interior of the conduit, as before stated.

In Fig. V the supporting-frames are shown as provided with extended arms, which carry the stringers on which the rails are laid, and the covering-plates with stiffening-flanges at their outer edges to give them strength.

I claim as my invention—

1. In combination with a conduit for an electric or a cable railway, having a longitudinally-extending opening therein, covering-plates having downwardly-extending flanges which enter the said opening and are curved toward the sides of the conduit, substantially as and for the purpose specified.

2. In combination with two adjacent lengths or sections of a conduit for an electric or cable railway, the abutting ends of which are practically in contact, a supporting-frame, substantially as shown, placed exteriorly of the said lengths or sections, to sustain and connect the same, and covering-plates attached to the said supporting-frames, adapted to contract the width of the longitudinal opening or slot in the said conduit, substantially as specified.

3. A conduit for an electric or cable railway, having a longitudinally-extending opening or slot therein, and exteriorly-situated supporting-frames combined with detachable covering or surface plates secured independently of the conduit to the said supporting-frames, substantially as specified.

4. The combination, in an electric railway, of a conduit formed of lengths or sections of fragile non-electricity-conducting material with a longitudinally-extending opening therein, metallic plates to partly cover the said opening and separated to form the grip-slot of the conduit, and a series of supporting-frames placed at intervals along the line of the conduit, and adapted to independently sustain both the conduit and the surface-plates, substantially as set forth.

5. In combination with a conduit for an electric or a cable railway, having a longitudinally-extending opening or slot therein, and provided with supporting-frames arranged along its length, of covering-plates situated at each side of the said slot in lengths which meet over the said frames and are secured thereto, substantially as specified.

6. In combination with a conduit for an electric or a cable railway, having a longitudinally-extending opening therein, and provided with supporting-frames, arranged at intervals throughout its length, of covering-plates separated to form the surface-slot, secured to said frames, having downwardly-projecting flanges adapted to come in contact with the inner sides of the conduit, to brace them against exterior pressure of earth, substantially as specified.

7. A conduit for an electric railway, formed of some non-metallic non electricity-conducting material, combined with exteriorly-situated metallic supporting-frames, substantially as specified.

ELIAS E. RIES.

Witnesses:
  WM. T. HOWARD,
  DANL. FISHER.